US006519376B2

(12) United States Patent
Biagi et al.

(10) Patent No.: US 6,519,376 B2
(45) Date of Patent: Feb. 11, 2003

(54) OPTO-ACOUSTIC GENERATOR OF ULTRASOUND WAVES FROM LASER ENERGY SUPPLIED VIA OPTICAL FIBER

(75) Inventors: Elena Biagi, Firenze (IT); Fabrizio Margheri, Firenze (IT); Leonardo Masotti, Firenze (IT); David Menichelli, Prato (IT)

(73) Assignees: Actis S.R.L. (IT); Esaote S.p.A. (IT)

( * ) Notice: Subject to any disclaimer, the term of this patent is extended or adjusted under 35 U.S.C. 154(b) by 20 days.

(21) Appl. No.: 09/920,123

(22) Filed: Aug. 1, 2001

(65) Prior Publication Data

US 2001/0055435 A1 Dec. 27, 2001

(30) Foreign Application Priority Data

Aug. 2, 2000 (IT) ........................................ FI00A0176

(51) Int. Cl.[7] ......................... G02F 1/335; H04R 23/00
(52) U.S. Cl. ........................... 385/7; 367/178; 367/191
(58) Field of Search ......................... 385/7, 4; 367/140, 367/178, 191

(56) References Cited

U.S. PATENT DOCUMENTS 4,593,565 A * 6/1986 Chamuel ..................... 73/601
5,481,633 A * 1/1996 Mayer ......................... 385/49
6,432,362 B1 * 8/2002 Shinar et al. ............ 422/82.01

FOREIGN PATENT DOCUMENTS

IT 1 286 836 9/1996

* cited by examiner

*Primary Examiner*—John D. Lee
*Assistant Examiner*—Tina M Lin
(74) *Attorney, Agent, or Firm*—McGlew and Tuttle, P.C.

(57) ABSTRACT

The opto-acoustic generator of ultrasound waves comprises an optical fiber associated to a laser-energy source, and an opto-acoustic transducer which is applied to said fiber and is designed to be impinged upon by the laser beam and to absorb partially the energy, converting it into thermal energy, thus bringing about the formation of ultrasound waves by the thermo-acoustic effect. Said opto-acoustic transducer consists of a layer or film containing prevalently graphite, which is applied on a surface of said optical fiber.

15 Claims, 2 Drawing Sheets

Fig.1
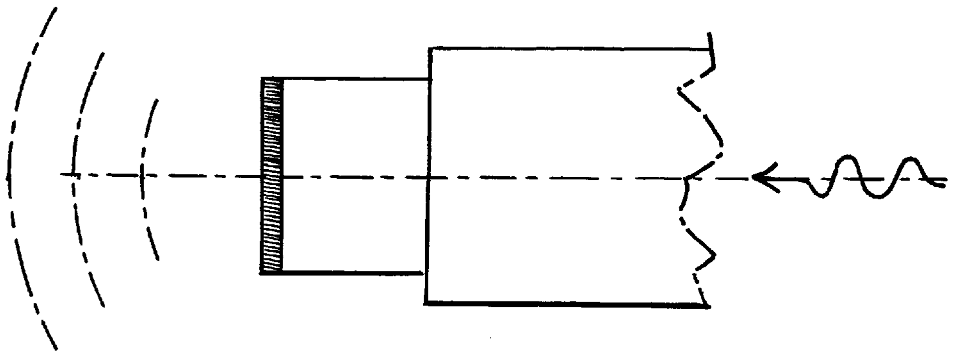
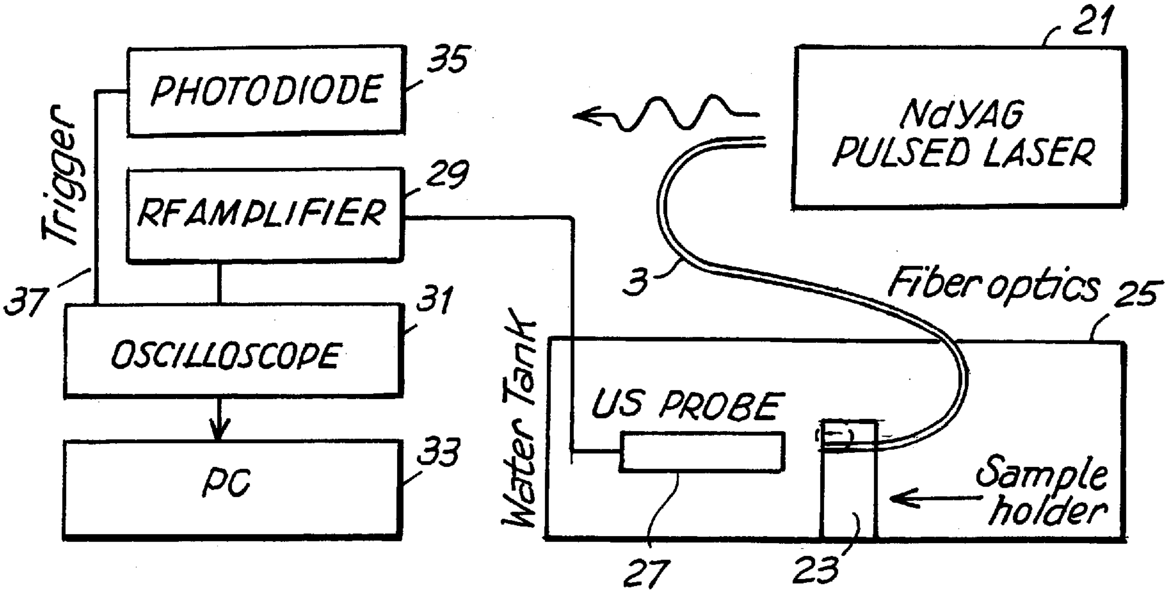
Fig.2

OPTO-ACOUSTIC GENERATOR OF ULTRASOUND WAVES FROM LASER ENERGY SUPPLIED VIA OPTICAL FIBER

The ultrasound source in question is based upon opto-acoustic generation of ultrasound waves by the thermo-elastic effect, in which the acoustic wave results from the interaction of a medium with a laser beam. The laser beam impinges upon the medium, and the reaction of the latter causes generation of a pressure wave in the surrounding environment. There exist various possibilities for generating ultrasound waves using laser pulses. In the present situation, the acoustic wave is generated by the thermo-elastic effect: the material impinged upon by the laser pulse heats up abruptly, and the consequent thermal expansion gives rise to the ultrasound wave.

Thermo-elastic generation of ultrasound waves is interesting because it does not entail damage to the material impinged upon by the radiation and because it does not require high-power laser sources. However, it has never found a consolidated practical or commercial application, on account of the extremely low conversion efficiency of the devices so far developed.

The Italian Patent No. 1 286 836 filed on Sep. 20, 1996 describes an opto-acoustic transducer for generating ultrasound waves, which comprises an optical fiber for conveying a laser beam and an element associated to said fiber and arranged in such a way that the laser beam impinges upon said element, which absorbs only partially the energy of said beam, converting it into thermal energy. The thermal shock induced by said conversion brings about the formation of ultrasound waves by the thermo-acoustic effect. The element consists of an opto-acoustic conversion layer applied on a portion of the optical fiber, and this conversion layer is generally metallic and consequently reflects a high percentage of the energy which reaches it, thus markedly reducing efficiency in transduction into ultrasound waves. The use of an antireflecting layer, such as a layer of dielectric material, has not yielded satisfactory results. The thin metallic layer frequently melts when the energy that impinges upon it exceeds certain limits.

In the attached drawings:

FIG. 1 shows the working diagram of the device;

FIG. 2 shows the diagram of the experimental apparatus used; and

Figure 3:
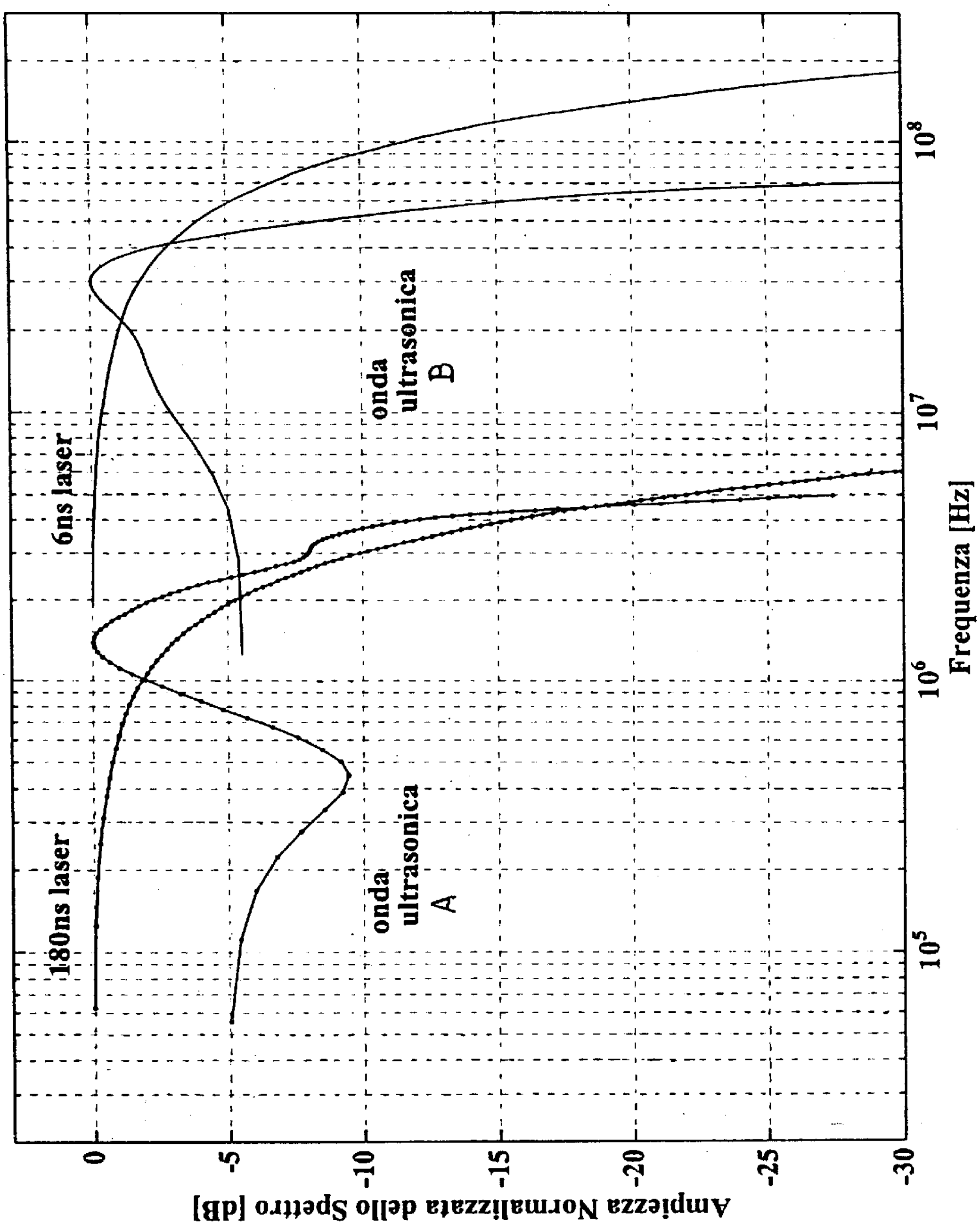

FIG. 3 presents graphs illustrating results obtained experimentally.

FIG. 1 of the attached drawings shows the working diagram of the device, which comprises—as absorbent element—a thin film 1 of absorbent material, which adheres to one end 3A of an optical fiber 3. The other end of the fiber must be connected to a pulsed laser source, the energy of which is transmitted by the optical fiber 3, as designated by f3, as far as the layer 1. When the laser pulses hit the absorbent film, the latter undergoes a sudden rise in temperature.

The region close to the tip of the fiber undergoes thermal expansion, and there the desired pressure wave is generated. An appropriate choice of the material and of the thickness of the film is the main problem that must be solved to obtain a good transducer. The metallic layer presents the drawbacks referred to previously.

Broadly speaking, if the transducer is properly built, the duration of the laser pulses and their peak power are the parameters that mostly affect the band and intensity of the ultrasound waves generated. Pulses of a few nano-seconds make it possible to obtain ultrasound waves of sufficient intensity and very wide band, even using a low-power laser (i.e., powers of the order of tens of mV). A period of the laser pulses that is long with respect to their duration is usually sufficient to guarantee cooling of the material between one heating step and another, so that any problem of thermal drift is ruled out. The wavelength of the laser light must be such that the film may, in fact, be considered absorbent.

The invention relates to an opto-acoustic transducer of the same type as those described above, which is improved and free from the drawbacks of known transducers, and which affords further purposes and advantages, as will emerge clearly from the ensuing description.

Forming the subject of the present invention is therefore an ultrasound generator with an opto-acoustic transducer of ultrasound Waves, of the type comprising an optical fiber associated to a laser-energy source, the opto-acoustic transducer being applied to said fiber and being designed to be impinged upon by the laser beam and to absorb partially the energy of the latter, transforming it into thermal energy, thus bringing about the formation of ultrasound waves by the thermo-acoustic effect. According to the invention, said opto-acoustic transducer consists of a layer or film prevalently containing graphite, which is applied on one surface of said optical fiber, namely on the beam-exit end of said optical fiber.

In practice and advantageously, said opto-acoustic transducer is constituted by graphite powder mixed with resins, especially low-acoustic-absorption resins and ones with characteristic impedance close to that of the medium where the ultrasound waves are to be propagated, such as an organic tissue. Said resins may be epoxy resins.

Another subject of the present invention is an optical fiber which is designed to be used in a generator—especially a laser source generator—and is provided with an opto-acoustic-transducer layer, which characteristically comprises prevalently graphite, either crystalline or amorphous graphite. The graphite can be applied as a film and machined, or else can be deposited using a chemico-physical process in itself already known, or yet again can be applied as a layer mixed with resin or adhesive, and then machined. Anchorage to the surface of the optical fiber is in any case ensured.

The graphite in the opto-acoustic film enables use of either infrared sources or visible-light sources; commercially available lasers can thus be used, which are present on the market in a wide variety of infrared sources and are also relatively inexpensive.

An ultrasound source built according to the ideas outlined above, when. applied, for example, to the beam-exit end of an optical fiber, as designated by 1 in FIG. 1, having a thickness of 1 to 10 micron, and hence implemented using graphite as absorbent material, by virtue of the excellent physical and mechanical characteristics of this material, possesses the notable qualities listed below:

a) Efficiency—The device can have a high efficiency of transduction if, and only if, the film is optically absorbent (otherwise the radiation traverses it without interacting with it, or else is reflected without contributing to the heating process) and must be capable of withstanding the high induced thermal gradient (otherwise, it would be perforated), as well as having a high modulus of elasticity (otherwise, the waves are generated inside the film and not in the surrounding medium). Graphite of itself possesses all these characteristics. In the case where graphite powder is used mixed with resins, which must be transparent to enable absorption by the graphite, it has been verified that the mechanical characteristics of the final compound are those of the resin itself, whilst graphite guarantees absorption of the radiation. It is therefore necessary to make sure that the resin chosen will guarantee, once it has hardened, quite good mechanical properties, as well as a substantial transparency. Epoxy resins are suitable for this purpose. It is likewise important that the thickness of the film should be adequate; the thickness must be sufficient to guarantee a good absorption of the radiation, whereas a film that is too massive will lead to a reduction in the efficiency and in the band both on account of the acoustic losses of the material and on account of the increased thermal inertia of the film. A thickness of between at least one micron and about ten microns is typically the best choice, depending upon the details of the composition of the film. A film that is relatively thicker will heat up only at its interface with the optical fiber; in the case of a film thickness smaller than one micron, both the entire film and the surrounding medium will undergo an increase in temperature.

b). Miniaturization—The transmitter is extremely compact since its overall dimensions are given by the surface of the section of the fiber, which, generally and preferably, is of the order of a few hundredths of square millimeter.

c) High electromagnetic compatibility—The connection between the transmitter and the laser that generates the pulses is altogether optical, and the generation of ultrasound waves does not involve any electrical phenomena. Consequently, there is no generation of electromagnetic disturbance. The only disturbance could be generated by the operation of the laser, which, in any case, may be shielded or kept at a due distance.

d) Bandwidth—Very-wide-band (tens of MHz) acoustic pulses may be obtained just using a material capable of heating up and cooling down fast. The bandwidth of the ultrasound pulses generated is generally close to that of the laser pulse. This statement is corroborated by theoretical forecasts and by experiments carried out using lasers having different pulse durations, as emerges from the examination of FIG. 2 attached. If graphite film is used, it becomes possible, and indeed very simple, to generate pulses with an extremely wide band (tens of MHz).

e) Resistance to wear and ageing—If the film is made with a material having good thermal characteristics—and graphite has excellent characteristics the continuous transients of heating and cooling do not cause any appreciable damage to the material (furthermore, the average power of the laser radiation may even be extremely low).

For proper operation, it is essential for the absorbing film, which constitutes the transducing layer, to contain a certain concentration of graphite so as to be opaque to laser radiation, typically infrared (IR) or visible light.

Two possibilities for making the films in question have been identified:

a) Deposited graphite: a graphite layer, either crystalline or amorphous, can be deposited directly on the tip of the optical fiber. In this case, it is possible to obtain a film of optimal thickness (just a few micron) easily.

b) Cementing-agent and graphite-powder based compounds, where the cementing agents can be hardened (such as resins or glues): and the graphite powder must be incorporated in a cementing agent (resin or other); once the cementing agent has dried, it must be transparent and resistant to heat. The mixture, once cemented on the tip of the fiber or other desired substrate and dried, can be machined in order to vary its thickness. The absorbing layer obtained by mixing graphite powder and epoxy resin possesses the required characteristics.

It is in any case important to use a resin having low acoustic absorption and, possibly, a characteristic impedance close to that of the medium where the ultrasound waves are to be excited (typically organic tissue, which has an acoustic impedance similar to that of water).

Ultrasound transducers and their sources must afford a high electromagnetic compatibility. This is a problem that has not been solved with the use of normal ultrasound transceiver systems, which are based upon the use of a single piezoelectric transducer designed to transmit and receive; the transducer converts the acoustic waves into electrical signals and vice versa. These devices present the problem that electrical excitation of the transmitter generates electrical disturbance, which combines with the electronics of the receiver, so limiting the maximum amplification of the signal. The generator and transducer according to the invention does not generate electromagnetic disturbance and is thus well suited for building integrated transceivers.

Frequently arrays of transmitters and corresponding receivers are provided for gathering information, for instance and especially, information of a diagnostic nature. For this reason, the transducers for generating ultrasound waves are often configured in the form of arrays so as to confer on the pressure wave generated the desired characteristics of directionality and spatial resolution. Arrays of a commercial type comprise from 128 to 256 elements distributed over a few linear centimeters, according to the technology used. Alternatively, some elements of the array function as transmitters, and others as receivers, each element of the array being connected to the electronics of reception and transmission with two conductors. The cable that connects the array to the electronics is thus made up of a bundle of numerous electrical wires, which simultaneously conduct the excitation signal of the high-voltage transducers and the reception signal, which is of the order of tens of microvolts. Consequently, interference phenomena induced by the vicinity of the conductors are inevitable. In addition, there exists another connection, of an acoustic type, which causes undesired effects and once again limits the amplification that can be achieved and the signal-to-noise ratio. In fact, the array is a rigid structure, and the receiving elements directly “feel” a part of the vibrations generated by the transmitting elements.

When the ideas underlying the invention are applied, it becomes simple to set up an array and to reduce interference both of an electrical and of an acoustic type, this amounting to a substantial advantage. In fact, if the transmitting elements of the array are built using optical-fiber generating devices and this is combined with the high level of performance that can be obtained with graphite, moreover maintaining the piezoelectric elements of the array only for receiving the return signals, the electrical interference induced by the conductors of the cable is altogether eliminated. Acoustic interference is markedly reduced, in so far as there is no longer any need to maintain a mechanically rigid connection between the receiving piezoelectric elements and the tips of the optical fibers. In practice, such a system can be built positioning a series of optical fibers, which constitute the transmitters, interspaced with the receiving elements of the array, In the graph of FIG. 3, the frequencies in Hz are given on the abscissa, whilst the normalized amplitudes of the spectrum (expressed in dB) of a series of Fourier spectra appear on the ordinate. Before calculation of the value in dB, each curve was normalized with respect to its maximum value, Two pairs of spectra may be seen. The first pair of spectra (designated as “180 ns laser” and “ultrasound wave A”)

occupies the left-hand portion of the graph; the two spectra represent the spectrum of the laser pulse with a 180 ns duration (i.e., the Fourier transform of the optical intensity I(t), understood as a function of time, measured using a photodiode) and the spectrum of the ultrasound pulse (Fourier transform of the pressure wave p(t) through the receiving probe) which the laser pulse generates when it impinges upon a graphite film. The pair of spectra in the right-hand portion of the graph is similar ("6 ns laser"; "ultrasound wave B"), with the difference that, in this case, a shorter laser pulse is being considered, i.e., one having a duration (at half the power) of 6 ns. All the spectra were measured experimentally in the same conditions (same fiber, same graphite layer, same receiving probe, same photodiode, and same distance between the graphite film and the receiving probe). Only the laser source was different. Both the probe and the fiber tip coated with the graphite film were immersed in a tank full of water so that the ultrasound waves were propagated in that medium.

The aforesaid FIG. 2 has been introduced to explain the following fact: the band of the ultrasound pulse is strictly linked to that of the laser pulse that generates it. Consequently, to obtain ultrasound pulses with bands of tens of MHz (which is something that is usually difficult to achieve using traditional transducers), it is sufficient to use a laser with fairly short pulses. As may be noted from the figure, with laser pulses of 6 ns, ultrasound pulses with a −3 dB band that extends from 10 MHz up to 40 MHz are obtained.

FIG. 2 presents a diagram of the experimental apparatus used to carry out the measurements. The reference number 21 designates a laser-energy source, the optical fiber 3 of which reaches the sample-holder 23 in the water tank 25, the source being the means for the emission of the ultrasound waves. The reference number 27 designates a probe which picks up the signals generated by the transducer. A radio frequency amplifier 29 is connected to an oscilloscope 31 associated to a PC 33. A photodiode 35, which is affected by the emissions of the generator 21, is associated to the oscilloscope 31 via the synchronization signal, i.e., the trigger 37. FIG. 1 represents an enlargement of what is associated to the beam-exit end of the optical fiber.

What we claim is:

1. An opto-acoustic generator of ultrasound waves, comprising an optical fiber associated to a laser-energy source, and an opto-acoustic transducer which is applied to said fiber and is designed to be impinged upon by the laser beam and to absorb partially the energy of the latter, converting it into thermal energy, thus bringing about the formation of ultrasound waves by thermo-acoustic effect, wherein said opto-acoustic transducer consists of a layer or film containing prevalently graphite, which is applied on a surface of said optical fiber.

2. The opto-acoustic generator according to claim 1, wherein said opto-acoustic transducer consists of a deposited graphite layer.

3. The opto-acoustic generator according to claim 1, wherein said opto-acoustic transducer consists of a preformed graphite film, applied on the fiber.

4. The opto-acoustic generator according to claim 1, wherein said opto-acoustic transducer consists of a layer of graphite powder mixed with substantially transparent cementing agents.

5. The opto-acoustic generator according to claim 4, wherein said cementing agents present low acoustic absorption and a characteristic impedance that is close to that of the media, such as organic tissue, where the ultrasound waves are to be propagated.

6. The opto-acoustic generator according to claim 4, wherein said cementing agents are epoxy resins.

7. The opto-acoustic generator according to claim 1, wherein the thickness of the transducing layer is between 0.5 micron and 20 micron, and preferably between 1 micron and 10 micron.

8. An optical fiber comprising, on one of its portions, an opto-acoustic-transduction layer made up prevalently of graphite, such as to be able to receive energy of an optical beam conveyed by the fiber, especially laser energy.

9. The optical fiber according to claim 8, wherein said layer is applied on the beam-exit tip of the optical fiber.

10. An array of transmitters and receivers, including generators, built according to claim 1, and receiving elements of a piezoelectric type or equivalent, interspaced with the generators.

11. The opto-acoustic generator according to claim 5, wherein said cementing agents are epoxy resins.

12. The opto-acoustic generator according to claim 2, wherein the thickness of the transducing layer is between 0.5 micron and 20 micron, and preferably between 1 micron and 10 micron.

13. The opto-acoustic generator according to claim 3, wherein the thickness of the transducing layer is between 0.5 micron and 20 micron, and preferably between 1 micron and 10 micron.

14. The opto-acoustic generator according to claim 4, wherein the thickness of the transducing layer is between 0.5 micron and 20 micron, and preferably between 1 micron and 10 micron.

15. The opto-acoustic generator according to claim 5, wherein the thickness of the transducing layer is between 0.5 micron and 20 micron, and preferably between 1 micron and 10 micron.

* * * * *